UNITED STATES PATENT OFFICE.

CHARLES H. MacDOWELL AND PAUL R. HERSHMAN, OF CHICAGO, ILLINOIS, ASSIGNORS TO MINERAL PRODUCTS CORPORATION, OF NEW YORK, N. Y., A CORPORATION OF MAINE.

PURIFYING ALUMINOUS MATERIAL.

1,291,979.  Specification of Letters Patent. Patented Jan. 21, 1919.

No Drawing. Application filed September 14, 1914. Serial No. 861,559.

*To all whom it may concern:*

Be it known that we, CHARLES H. MAC-DOWELL, a citizen of the United States, and PAUL R. HERSHMAN, a subject of the Emperor of Austro-Hungary, both residing in the city of Chicago, county of Cook, State of Illinois, have invented certain new and useful Improvements in Purifying Aluminous Material; and we do hereby declare the following to be a full, clear, and exact description of the invention, such as will enable others skilled in the art to which it appertains to make and use the same.

The present invention is based upon the discovery that when aluminous material, containing silica and iron as impurities, such as raw or uncalcined alunite, or the crude oxid from calcined alunite, is heated, in the presence of carbon, in an inert gas (*i. e.*, a gas, such as nitrogen, which does not consume the carbon) to a temperature above 1650° C. all of the silica is volatilized. When the heating operation is carried on in a carbon-consuming gas, enough additional carbon should be employed to make up for the carbon so consumed.

The invention is based upon the further discovery that when such aluminous material is heated, in the presence of carbon, and also in the presence of a chlorid, such as sodium chlorid, and an acid, to a temperature above 1650° C., the iron present is likewise volatilized.

The purpose of the invention is to remove, by a furnace process, the silica and iron appearing as impurities in aluminous material, so that the purified material may be the better adapted for the uses for which it is to be employed in the arts, as, for instance, its subsequent utilization in the production of aluminum.

In practice, we find it feasible and appropriate to remove both the silica and the iron from the aluminous material, in the same heating operation, although, as above indicated, the silica may be removed without removing the iron, if, for any reason, it should be desirable to do so. It seems probable that the removal of the silica is due to its reduction by the carbon to silicon, which is volatile at the temperature referred to. So also, it is probable that the iron in the presence of say sulfuric acid is converted into sulfate and that this, in turn, in the presence of a chlorid, such as common salt, is converted into iron chlorid, which is volatilized.

In proceeding from the raw alunite, it is not necessary to add sulfuric acid, for the reason that there is sufficient sulfuric acid potentially present in the raw or uncalcined alunite to supply the quantity needed. Accordingly, we have found that upon heating raw or uncalcined alunite to about 1650° C., with about 10% by weight of carbon and 10% by weight of sodium chlorid, the resulting product contains no silica, and only a trace of iron. As hereinbefore indicated, the percentage of carbon present should be protected from being consumed by any element present in the gaseous atmosphere of the furnace, or if partial consumption of the carbon by any gaseous element in the atmosphere of the furnace is inevitable, a sufficient excess of carbon should be employed to compensate for the loss.

What we claim is:—

1. The method of purifying aluminous material from silica and from iron, which comprises heating such material in the presence of carbon, a chlorid capable of decomposition at the temperature used, and an acid capable of decomposing the chlorid to a sufficient temperature to drive off and volatilize the silica and iron; substantially as described.

2. The method of purifying raw and calcined alunite from silica, which comprises heating the alunite in the presence of carbon, to a temperature sufficient to volatilize and drive off the silica; substantially as described.

3. The method of purifying raw and calcined alunite from silica and iron, which comprises heating the alunite in the presence of carbon, sulfuric acid and a chlorid capable of decomposition at the temperature used, to a temperature sufficient to drive off and volatilize the silica and iron; substantially as described.

In testimony whereof we affix our signatures, in presence of two witnesses.

CHARLES H. MacDOWELL.
PAUL R. HERSHMAN.

Witnesses:
HENRY H. HAMMER,
CARL F. HAGEDORN.